United States Patent [19]

Kuge et al.

[11] Patent Number: 4,883,715

[45] Date of Patent: Nov. 28, 1989

[54] ELASTIC ROTATABLE MEMBER

[75] Inventors: Tsukasa Kuge, Tokyo; Masahiro Goto, Kawasaki; Isamu Sakane, Ohtsu, all of Japan

[73] Assignees: Canon Kabushiki Kaisha, Tokyo; Kabushiki Kaisha I.S.T., Ohtsu, both of Japan

[21] Appl. No.: 143,185

[22] Filed: Jan. 13, 1988

Related U.S. Application Data

[62] Division of Ser. No. 831,729, Feb. 21, 1986, Pat. No. 4,804,579.

[30] Foreign Application Priority Data

| | | | |
|---|---|---|---|
| Feb. 28, 1985 | [JP] | Japan | 60-39063 |
| Apr. 12, 1985 | [JP] | Japan | 60-78646 |
| Apr. 12, 1985 | [JP] | Japan | 60-78647 |
| Oct. 12, 1985 | [JP] | Japan | 60-229020 |

[51] Int. Cl.[4] ........................ B32B 27/28; B32B 27/20; F27B 7/28; B65H 27/00

[52] U.S. Cl. .................................... 428/421; 428/422; 428/447; 428/448; 428/451; 428/515; 29/132; 432/60; 219/216

[58] Field of Search ............... 428/323, 325, 329, 328, 428/331, 421, 422, 447, 448, 451, 461, 462, 515, 516, 519, 520; 29/132; 432/60; 219/216

[56] References Cited

U.S. PATENT DOCUMENTS

| | | | |
|---|---|---|---|
| 2,794,240 | 6/1957 | Allen | 29/131 |
| 4,568,275 | 2/1986 | Sekurai | 432/60 |

FOREIGN PATENT DOCUMENTS

| | | |
|---|---|---|
| 0142716 | 5/1985 | European Pat. Off. . |
| 7801417 | 5/1978 | Fed. Rep. of Germany . |
| 3518705 | 11/1986 | Fed. Rep. of Germany . |
| 0069542 | 3/1968 | German Democratic Rep. . |

OTHER PUBLICATIONS

Grant and Hackh's Chemical Dictionary, 5th Ed., pp. 201 and 503, (1987).

*Primary Examiner*—Ellis P. Robinson
*Assistant Examiner*—Susan S. Rucker
*Attorney, Agent, or Firm*—Fitzpatrick, Cella, Harper & Scinto

[57] ABSTRACT

An elastic rotatable member usable for image fixing includes an elastic layer having a roughened surface, a resin layer formed by applying a liquid resin on the surface of the elastic layer and heating it up to a temperature not lower than its crystalline melting point and then quickly cooling it, wherein the resin layer has a side near the elastic layer, having a number of fine concave and convex portions, and wherein the convex portions are in concave portions of the surface of the elastic layer, and the concave portions of the resin layer is pressed by the convex portions of the elastic layer.

15 Claims, 3 Drawing Sheets

ELASTIC ROTATABLE MEMBER

This is a division of application Ser. No. 831,729 filed Feb. 21, 1986 U.S. Pat. No. 4,804,579, Feb. 18, 1988.

FIELD OF THE INVENTION AND RELATED ART

The present invention relates to an elastic rotatable member, such as an elastic roller or belt, more particularly to a rotatable elastic member having a backing rubber layer and a surface resin layer thereon. The roller of the present invention is concerned with conveying means for conveying goods or articles; conveying rotatable member such as a roller or belt usable with office equipment, for example, a roller or belt for feeding paper in a printer or the like, a platen roller for a word processor, or a conveying roller for a duplex (forming images on both sides of paper) recording apparatus; and an image fixing roller or belt such as a heating roller, a pressing roller, heating-pressing roller or the like for fixing an image or drying the paper, usable with an image forming apparatus such as a copying machine, a printer, a facsimile machine, a printer or a combination thereof.

Generally, in order to convey or transport a sheet of paper or an article, a roller or belt provided with a rubber surface layer or a resin surface layer is used. With use, however, the surface of such a roller or belt is worn so that the conveying action becomes not proper. For example, the diameter of the rubber roller reduces, or the surface hardness changes with long time use, with the result of failure of transportation or image transfer (platen roller or the like). On the other hand, the resin roller is not easily worn, but it is poor in elasticity, and therefore, only a slight amount of wear which is possible with long time use can results in improper conveyance.

In any case, the conveying rotatable members for feeding sheets of paper have not been durable to 200,000 sheets conveyance with the desirable performance maintained. It is, therefore, desired to provide a durable and non-adherent roller or belt which has a proper surface hardness and which can be resiliently contacted to the sheet or another article, with high reliability.

In the field of the image fixing, the similar resin roller or rubber roller is used. Additional burdens are imposed on such a roller from the standpoint of heat and pressure. It is popular to use as a heating roller contactable to a toner image a roller coated with tetrafluoroethylene resin and to use, as a pressing-roller press-contacted to the heating roller to increase the time period of heating and pressing the toner image, a roller coated with a rubber layer. Those rollers form a nip by the press-contact therebetween. Since, however, the surface of the heating roller is like a rigid member, it does not sufficiently follow the minute roughness of the sheet surface having the toner image with the result of less effective heat transfer during the heating and pressing operation. Therefore, the quality of the fixed image is poorer than when a rubber roller is used as a heating roller, and curl of the sheet produced is larger. If the rubber roller is used for the heating roller contactable to the toner image, the image offset increases because of its poor releasability, and it is relatively easily worn by a separation pawl, a sensor or the like contacted thereto, because of its poor durability to wear, resulting in increasing occurrence of partial non-image fixed parts or partial image offset.

Under the circumstances, the rubber roller and the resin roller have their own advantages and corresponding disadvantages. Therefore, a roller is desired which has the advantages of both of them.

As a novel solution to the problems, the inventors have proposed an elastic rotatable member and an image fixing apparatus in U.S. Ser. No. 793,546 filed on Oct. 31, 1985, now U.S. Pat. No. 4,842,944 issued June 27, 1989. The proposed solution is very effective in that it eliminates the problems in the conventional ones. The present invention has been achieved as a further improvement of the earlier invention. It has been found that the present invention is not limitedly applicable to the earlier invention, but it is also applicable to the other roller and apparatus.

SUMMARY OF THE INVENTION

The inventors have found through experiments that the durability of the surface resin layer of the elastic rotatable member after the manufacturing, varies within a certain range, depending on individual rots of the elastic rubber roller which is the back layer. The inventors have searched for the causes of this with great efforts, since the phenomenon is not known. As a result, it has been concluded that the variation in the state of close-contact or bonding between the back elastic layer and the surface resin layer, is a significant cause.

More particularly, if the close-contact is poor, the resin layer is stressed between the backing elastic layer and the material to be conveyed thereby, even to such an extent that the resin layer is peeled off the elastic layer. Thus, the durability is low. The inventors have tried to use a bonding agent (primer), but the manufacturing accuracy has been varied without increasing the close-contact therebetween.

Particularly when the elastic rotatable member is used in an image fixing device, the repeated pressure application and the high temperature, result in the peeling between the resin layer and the elastic layer.

On the other hand, the inventors have also tried, aiming at enhancing the durability characteristics of the elastic rotatable member, to form a multilayer of the resin on the elastic layer in order to increase the thickness of the resin layer itself. However, the conclusion has been that it is difficult to satisfactorily increase the close-contact between the resin layer and the elastic layer by the increase of the resin layer alone. On the contrary, a disadvantages arises, that is, the resultant increase of the electric resistance of the resin results in increase of electric charge through friction.

The present invention is achieved through further investigation of the above-mentioned earlier invention, but it has also been found that the present invention is applicable to a resin layer formed on an elastic layer manufactured in conventional methods In any case, it is desired that the durability of an elastic rotatable member is stabilized and that the decrease of durability thereof avoided which may be caused by a concentrated local stress between the rubber layer and the resin layer during sheet-transportation through a nip.

Accordingly, it is a principal object of the present invention to improve characteristics of an elastic rotatable member.

It is a further object of the present invention to provide an elastic rotatable member manufactured by applying liquid resin on an elastic layer and sintering it as a resin layer.

It is a further object of the present invention to provide an elastic rotatable member manufactured by applying liquid resin on an elastic layer and sintering it as a resin layer, wherein the variation in the close-contact or close-adherence between the resin layer and the elastic layer is reduced, noting the importance of the close-adherence.

It is a further object of the present invention to improve a property of an elastic rotatable member, noting a structure in the interface between the elastic layer and the resin layer.

It is a further object of the present invention to provide an elastic rotatable member in which the close adherence is increased even when the thickness of the resin layer is increased.

It is a further object of the present invention to provide an image fixing apparatus having an increased durability and capable of maintaining good image quality, by using an elastic rotatable member according to the present invention.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

The present invention is characterized in the configuration and/or states in the elastic layer side of the resin layer formed on the elastic layer, more particularly, in the adhering portion of the resin layer with the elastic layer.

The first embodiments relates to the state of adherence between the surface of the elastic layer an the resin layer. The elastic rotatable member according to this embodiment comprises an elastic layer and a resin layer thereon, wherein the resin layer is formed on the roughened surface of the elastic layer. Thickness td (micron) of the resin layer, after being peeled off the elastic layer, measured by physical contact, and a thickness tw (micron) determined by converting the weight of the resin layer into a thickness, satisfy the relationships:

$$0.5 \leqq (td - tw) \leqq 5$$

Furthermore, the thickness tw and a thickness tm (micron) figured out as one half of an absolute value of a difference between an external diameter $d_1$ of the elastic rotatable member having the resin layer measured by non-contact method and a diameter $d_2$ of the same after the resin layer is peeled off, measured by non-contact method, satisfy:

$$tw > tm.$$

The elastic rotatable member and the image fixing apparatus according to this embodiment of the present invention satisfy those relationships.

The first embodiment (example) according to the present invention is particularly effective when the elastic layer is made of silicone rubber, and the resin layer is produced by sintering tetrafluoroethylene up to 327° C. or higher. According to this embodiment, 1,000,000 paper sheets can be conveyed in an ordinary manner (several tens thousand in the conventional apparatus at maximum): and even in the case of image fixing, the durability is increased remarkably up to 100,000 sheets or more. This has been confirmed through experiments.

A first example according to the present invention will be described. Some parts thereof are common to the second and third embodiments which will be described hereinafter.

Figure 1:
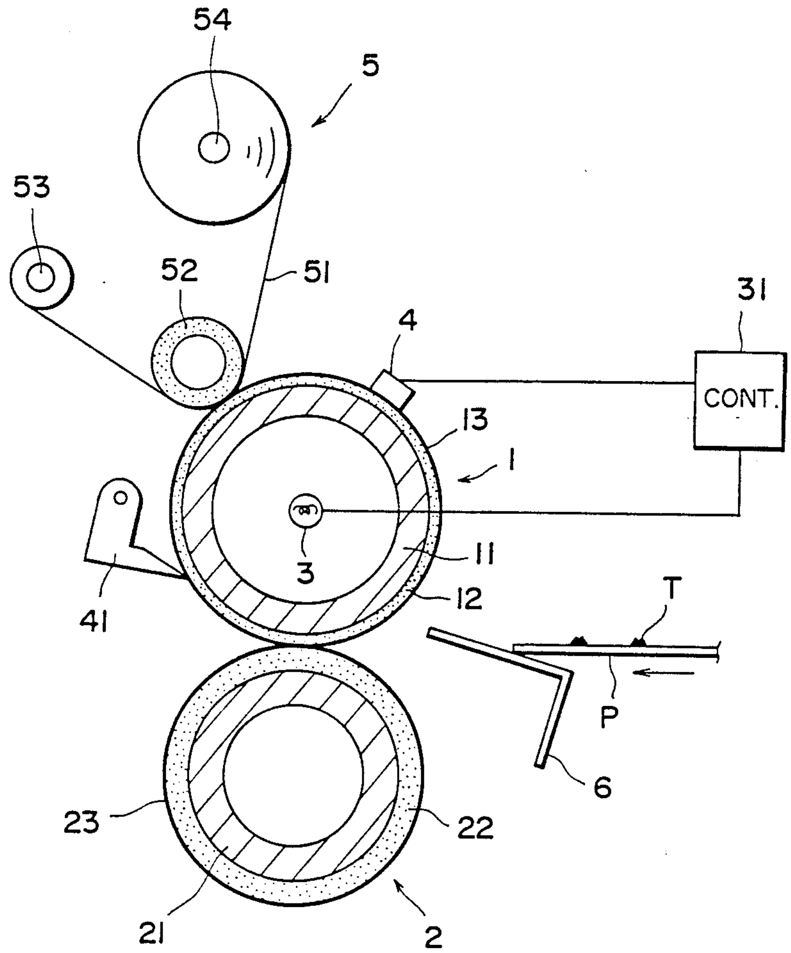
FIG. 1 is a sectional view of an image fixing device to which an elastic rotatable member according to the present invention is applicable.

FIG. 1 illustrates an image fixing device according to an embodiment of the present invention.

The fixing device includes a fixing roller 1 contactable to an fixed toner image, a pressing roller 2 press-contacted to the fixing roller 1 for rotation therewith. The elastic rotatable member described above is used for each of those rollers 1 and 2.

The fixing roller 1 has a core metal 11 of good thermal conductivity, such as aluminum, an elastic layer 12 of silicone rubber having a relatively small thickness, for example, 0.3–0.8 mm in this embodiment, and a surface layer 13 of fluorine resin such as PFA (perfluoroalkoxylethylene) and PFTE (polytetrafluoroethylene) having a thickness less than that of the elastic layer, for example, 10–30 microns in this embodiment. The pressing roller 2 has a metal core 21 of stainless steel or iron, an elastic layer 22 of a relatively large thickness which is larger than that of the silicone rubber elastic layer 12, for example, 4–10 mm in this embodiment, and a surface resin layer 23 of a fluorine resin such as PFA and PTFE having a thickness smaller than that of the elastic layer 22, for example, 5–50 microns in this embodiment. The film strength of the resin layer of each of the rollers 1 and 2 is preferably not less than 50 kg/cm$^2$.

Figure 2:
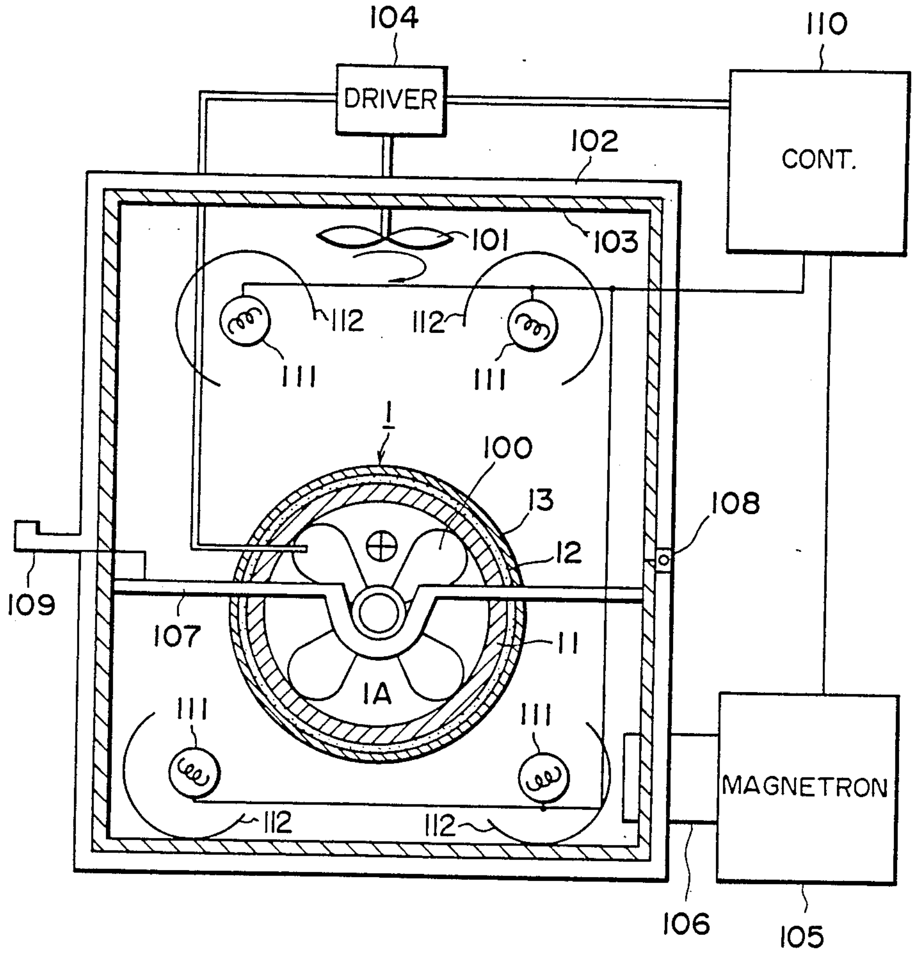
FIG. 2 is a sectional view of an apparatus for manufacturing an elastic rotatable member according to the present invention.

Those rollers may be produced in a manner described in conjunction with FIG. 2. More particularly, a rubber layer (thermal conductivity of $1.4 \times 10^{-3}$) is vulcanized and molded on a metal core to form a silicone rubber roller in a desired shape. In this case, the desired shape is a reversely crowned, that is, the central portion of the roller has a diameter slightly smaller than those of the end portions. To the surface of the rubber roller, the dispersion of fluorine resin powder in water with surface-active agent is applied over the entire length of the roller into a uniform thickness. Thereafter, it is heated in an apparatus shown in FIG. 2, which will be described hereinafter. A thermal gradient is formed across the thickness of the silicone rubber, but it is heated only to about 260°–280° C., while the fluorine resin is heated up to a sintering temperature of 340°–380° C. which is higher than the crystalline melting point (327° C. in the case of PTFE, 306° C. in the case (of PFA) for 5–10 minutes. After the sintering, the roller is quickly cooled. By those steps, on the silicone rubber roller, a sintered fluorine resin layer having the resin properties including the crystallinity of not more than 95% and the tensile strength of not less than 50 kg/cm$^2$, and the contact angle (water) of not less than 100 degrees. The resin layer is sufficiently thick and sufficiently strongly bonded to the rubber roller.

Therefore, the silicone rubber of the fixing roller 1 and the pressing roller 2 shows the desirable rubber properties which are substantially equivalent to those before the formation of the surface resin layer (sintered), while on the other hand, the surface fluorine resin layer shows the resin properties which are the same as those completely sintered alone.

FIG. 2 will be explained here, which shows the apparatus for producing the rotatable member according to the present invention. A vulcanized and molded rubber layer is formed on a core metal into a desired shape. Onto the surface of the rubber layer, resin powder (not sintered), in the form of a dispersion (the resin powder is dispersed in water with surface-active agent), enamel, powder or the like is applied over the entire length of the rubber roller uniformly by spray, electrostatic deposition, powder coating or the like. Then, the resin coating is heated up to a high temperature which is higher than a crystalline melting point of the resin, while keeping the rubber roller below such a temperature that the rubber does not smoke or depolymerize. More particularly, the surface resin is quickly heated, while quickly cooling the rubber layer from the inside of the core metal. In the apparatus of FIG. 2, a dielectric heating method is used which utilizes the fact that the dielectric loss tangent of the liquid resin (dispersion or enamel) is larger than that of the rubber layer. Although this method is preferable, the present invention is not limited to this method of manufacturing.

FIG. 2 is a sectional view of an apparatus by which an elastic rotatable member according to this invention can be manufactured, wherein both of a dielectric heating device and an infrared external heating device are used in combination. The apparatus comprises a magnetron 105 for producing high frequency (950–2450 MHz), a waveguide 106 for transmitting the high frequency produced by the magnetron 105, an openable resin container 102 having an inside liner plate 103 of a metal for reflecting the high frequency, the container 102 being connected with the waveguide 106. The apparatus further includes in the container 102 infrared lamp 111 for additionally heating the roller from the outside thereof, and includes a shade 112.

Within the resin container 102, there are fan 100 for producing air flow in the central space of the hollow roller, a fan 101 for producing air flow in the container 102, which are driven by external driving devices, respectively. The container 102 is openable about a pivot 108, wherein the upper part has a grip 109 fixed thereto, and the lower part has an arm 107 fixed thereto for positioning a flange lA of the roller 1.

The apparatus includes a control device 110 which serves to control the driving device 104, the magnetron 105 and the infrared lamp 111 in response to the opening or closing of the container on the basis of a predetermined starting signal with a variable timer not shown.

Since the roller 1 has a surface resin dispersion and a backing rubber layer. Therefore, the energy of the high frequency is absorbed more by the dispersion having a higher relative dielectric constant than the rubber layer. The resin dispersion is quickly heated by the high frequency and the infrared lamp in the thermostatic chamber to such an extent above its sintering temperature. At this time, the rubber layer absorbs less energy of the high frequency with the result that it is not heated such high as the dispersion, and it is maintained relatively low. Because of this, the above-described roller properties or characteristics can be provided.

An embodiment of the present invention includes an elastic rotatable member having the rubber layer thickness of 0.1–10 mm and the resin layer thickness of 1–50 microns. Those thicknesses may be averages of the respective layers, and preferably they are minimum thicknesses.

Although there is no bonding layer between the resin layer and the rubber layer in the manufacturing method described above. However, the present invention includes an elastic rotatable member with such a bonding layer.

The resin layer preferably contains which is high in the dielectric constant, and more specifically, it may be of silicone, polyimide, polyamide, polyamideimide or the like.

As for the rubber layer, it is of rubber material having a heat-durable temperature which is lower than the melting point of the resin material, more specifically, it may be of ethylenepropylene rubber or the same rubber mixed with another rubber.

Referring back to FIG. 1, the other structures of the fixing device will be explained.

The fixing device comprises a heater 3, such as a halogen lamp or the like, for heating the fixing roller internally. The surface temperature of the fixing roller 1 is controlled by the heater 3, a temperature sensor 4 and a control system 31 to be an optimum temperature at all times, which is proper to fuse the toner, more particularly, 160°–200° C. The fixing device further comprises an off-set preventing liquid applying device which also functions as a cleaning device, for applying an off-set preventing liquid such as a silicone oil to the surface of the fixing roller 1. The applying means 5 may includes a felt-like member, but a web is used in the embodiment. The web 51 containing the off-set preventing liquid is contacted to the fixing roller 1 by an elastic urging roller 52 such as a silicone sponge or the like so that a small amount of off-set preventing liquid is applied to the surface of the fixing roller 1. The web 51 is taken up by the take-up roller 53 from the supply roller 54 so that the part of the web contacted to the fixing roller 1 sequentially changes by an unshown control device.

In operation, the recording sheet P bearing the unfixed toner image T is guided by an inlet guide 6 and is received by the nip formed between the rollers 1 and 2. The toner image T is fixed on the recording sheet P into a permanent image by being passed through the nip. The separation pawl 41 contacted to the surface of the roller 1 serves to separate the recording sheet P from the surface of the roller 1 after the fixing operation.

The rollers 1 and 2 for fixing the image according to this embodiment of the present invention involve novel features. Namely, since the silicone rubber characteristics are not deteriorated by heat, while on the other hand, the fluorine resin is completely sintered, it exhibits a sufficient impact resilience; the permanent compression strain of the silicone rubber is small; the releasability of the surface thereof is good; the durability to wear is high; and the elasticity is sufficiently high. Additionally, even if the stress resulting when the toner image is fixed to the recording sheet is localized at the interface portion between the silicone rubber layer and the fluorine resin layer, those layer are not rapidly separated because the strength of the fluorine layer is high, and in addition, the bonding therebetween is strong. Thus, the durability is remarkably improved.

Figure 3:
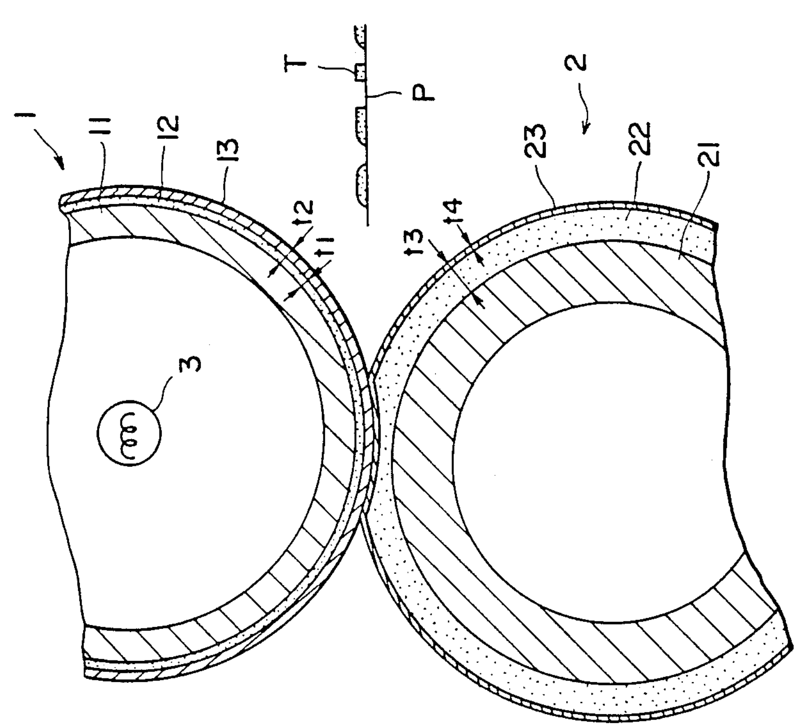
FIG. 3 is an enlarged sectional view of a fixing device which includes an elastic rotatable member according to the present invention.

FIG. 3 is an enlarged cross-sectional view of the fixing device of FIG. 1. Among the thickness $t_1$ of the elastic layer 12 of the fixing roller 1, thickness $t_2$ of the resin layer 13 of the fixing roller, thickness $t_3$ of the elastic layer 22 of the pressing roller and thickness $t_4$ of the resin layer 23 of the pressing roller, there are preferably the following relations:

$t_1 > t_2$ (fixing roller 1)

$t_3 > t_4$ (pressing roller 2)

Further preferably, $t_4 < t_2 < t_1 < t_3$.

With those relations satisfied, the fixing roller 1 and the pressing roller 2 are cooperative to compensate the drawbacks of the other and enhance the advantages of the other, so that the image quality, the fixing properties and durabilities are improved. In this embodiment, the fluorine resin dispersion is, for example, tetrafluoroethylene resin dispersion D-1 available from Daikin Kabushiki Kaisha, Japan.

The above-described fixing rollers 1 and 2 each satisfy the requirements of the following in this example. Thickness td (micron) of the resin layer, peeled off the elastic layer, measured by physical contact and a thickness tw (micron) determined by converting the weight of the resin layer into a thickness, satisfy the relationships:

$0.5 \leqq (td - tw) \leqq 5.$

Furthermore, the thickness tw and a thickness tm (micron) figured out as one half of an absolute value of a difference between an external diameter $d_1$ of the elastic rotatable member having the resin layer measured by non-contact method and a diameter $d_2$ of the same after the resin layer is peeled off, measured by non-contact method, satisfy:

$tw > tm.$

It is preferable that the diameter difference ($d_1$-$d_2$) is not less than 3 microns, since then, the resin layer goes into the fine concave portions of the elastic layer having a rough surface constituting fine concave and convex portions, and since the resin layer is closely adhered to the elastic layer in the manner of pressing the elastic layer. This increases the durability.

More detailed example will be explained together with a comparison example.

Several image fixing rollers are a roller according to the present invention having the following properties have been produced:

The resin layer: PTFE, tw=10 microns:

The elastic layer (rubber layer): the average surface roughness Rz=10 microns, the thickness of the rubber layer = 0.5 mm, the outer diameter = 40 mm (measured by a laser length meter (available from Canon Kabushiki Kaisha Japan)).

Among those rollers, two was taken, and the resin layer is peeled off the rubber layer. The thickness of the resin layer was measured by a dialgage and micrometer. The thickness td (microns) obtained thereby, is indicative of substantially the maximum thickness or the thickness near the maximum. The data were 11 and 13 microns which averaged to 12 microns (contact measurement). The outer diameter of the elastic rotatable member ($d_1$) was 40.012 mm, while the outer diameter of the elastic layer after the resin layer was peeled off ($d_2$) was measured as 40.000 mm by a non-contact measurement with the use of the above-described layer meter.

Therefore, the thickness tm calculated as $(d_1 - d_2)/2$ is 6 microns so that the requirement of tw>tm is satisfied. Also, (td−tw)=1-3, which are represented as 2, satisfy $0.5 \leqq (td - tw) \leqq 5$. Here, the thickness tw is determined by:

weight of the resin layer/(specific gravity × surface area) in the above case.

The specific gravity of the material of PTFE is 2.25 g/cm$^3$. The surface area of the fixing roller was $(40/2)^2$ cm$^2$. The weight of the resin layer was measured by an analytical balance.

As for the pressing roller, an ordinary silicone rubber roller having the thickness of 10 mm, not having the feature of the present invention, has been prepared.

By constructing an image fixing device using those, there has been no problem recognized in the fixing roller after 300,000 image fixing operations. The fixing action thereof has been confirmed as being stabilized and satisfactory. Further, various properties of the fixing roller has indicated that it can be used further.

As a comparison, several kinds of fixing rollers were prepared and were subjected to the same fixing operation.

(1) A roller "A", satisfying the relationships of $-1.5 \leqq (td - tw) \leqq -3$ only. After 90,000 fixing operations of A4 size (JIS) sheet conveyed in the short side direction, the diameter of the fixing roller was bulged at a portion contacted to the separating pawl. At the time of approximately 100,000 sheets, there were recognized cracks in the resin.

(2) A roller "B" satisfies $5.5 \leqq (td - tw)$. The roller B was contaminated after 50,000 sheets of the same size as with roller "A" was fixed. This showed the poor releasability with respect to the off-set toner.

(3) A roller "C" satisfies $2 \leqq (td - tw) \leqq 3$, and $0 \leqq (tm - td) \leqq 1$, that is, $tw \leqq tm$. This roller showed cracks on the roller surface and partial peeling at the portion where edges of the sheet passes, after 70,000 image fixing operations.

(4) A roller D satisfies $2 \leqq (td - tw) \leqq 3$, and $(tw - tm) > 3$. No problem has been showed after 300,000 sheets fixing operations. Additionally, the fixing properties are good with satisfactory releasability from the toner.

With the structures satisfying the above requirements, the fixing device is satisfactorily durable and is able to provide satisfactorily high image fixing effects.

The significance of the parameter (td-tw) will be described. The measurement by the physical contact to obtain the thickness td is influenced by the depression caused by the pressure of the physical contact, it is indicative of the surface roughness of the inside surface of the resin layer (in the above case, the surface roughness is formed correspondingly to the surface roughness of the backing elastic layer). The measurement td larger than the apparent thickness tw means that the material of the resin layer extends into the concave portions of the surface roughness of the elastic layer. If the surface of the backing elastic layer is smooth, the thickness td is equal to or smaller than the thickness tw. If, on the contrary, the surface roughness of the elastic layer is quite high, the thickness td is far larger than the thickness tw.

The requirement, $0.5 \leqq (td-tw) \leqq 5$ defines the surface roughness of the elastic layer and the degree of the resin layer extending into the concave portions of the surface roughness of the elastic layer, so that they provide a satisfactory durability, fixativeness and releasability.

If the parameter, (td−tw) is lower than the limit, the bonding strength between the resilient layer and the resin layer is so weak that there occurs sliding between the layers during use with the result of bulging of the resin layer, which has been confirmed through experiments. If the parameter is larger than the upper limit, the surface roughness of the elastic layer is high, which increases the surface roughness of the resin layer, so that it is contaminated with the toner.

The requirement, $tw > tm$, means that the resin layer contracts the elastic layer, which provides a close-contact force between the elastic layer and the resin layer in addition to that provided by the surface roughness of the elastic layer.

According to this embodiment of the present invention, those requirements are simultaneously satisfied, and therefore, a closely engaged state is established between the resin layer and the surface of the elastic layer at the contact portion by the meshing engagement between their surface roughness, and additionally, the engaged state is enhanced by the contraction of the resin layer toward the convex portion of the resilient layer, thus increasing the close contact therebetween, whereby the surface roughness of the elastic roller is increased. In the ordinary sheet conveyance, 500,000 sheets could be conveyed without difficulty; and in an image fixing device, 200,000 or more sheets could be fixed with satisfactory image fixing effects and with good releasability.

When the requirements of $0.5 \leqq (td-tw) \leqq 5$ and $tw > tm$ are used, the structure can be roughly checked on the basis of the averaged measurements. Particularly, when the requirements of $1.0 \leqq (td-tw) \leqq 3$ and $(tw-tm) > 3$ were satisfied, 700,000 sheets were conveyed without difficulty in the ordinary conveyance; and 30,000 or more sheets could be processed in the fixing device with good effects and good releasability. Therefore, those requirements are further preferable.

It is preferable for obtaining the measurements of thickness that at lease several points are measured to obtain an average, and that almost all of the measurements are within the above-described limit. In other words, the maximum and the minimum of the measurements are within the above limit, and the average is, of course, within the limit. When the elastic layer (rubber layer) is of silicone rubber, the rubber hardness (JISA) is preferably not less than 30 degrees but not more than 80 degrees, and the elongation and the tensile strength are preferably not less than 100% but not more than 150%, and the tensile stress not less than 10 kg/cm$^2$.

As for an image fixing apparatus, it is practically preferable that the durable number of sheets is not less than 100,000, that the fixing rate is not less than 70%, from the standpoint of the stability and reliability. The above-described requirements provide the satisfaction of those preferable conditions.

When the thickness of the resin layer is increased up to 10 microns or more, the durability is increased 250,000 or more; and when it is not more than 15 microns, the durability is 300,000 or more. The fixing effect can be maintained high because the possible adverse affect provided by the increase of the resin layer thickness can be compensated by the impact resilience of the rubber layer. Particularly, the present invention is effective when a fluorine resin layer is formed on a silicone rubber layer.

In the first example of the present invention, the close engagement between the concave and convex portions of the resin layer and those of the elastic layer surface is established at the portion where they are contacted, and in addition, the contraction force of the resin layer is effective to press the convex portions of the elastic layer to enhance the close-contact therebetween with the result of increasing the smoothness of the elastic roller surface. With this structure, 500,000 sheets can be conveyed in an ordinary conveyance without difficulty; and as for the image fixing rollers, 200,000 or more sheets can be processed with good fixing effect and releasability.

The advantages of the present invention as a whole common to the elastic rotatable members, including an image fixing roller or belt, are that the durability to wear and the surface releasability are good, that the surface property of the resin layer and the elastic property of the rubber layer are so good that the follow-ability to toner images and to another roller is improved, and that the service life is long enough.

The image fixing apparatus according to the present invention as a whole includes, when the above-described fixing roller is used as one of the rollers (including a belt for pressing the recording material, the advantages are provided that the curling of the recording material is prevented, that the fixed image is sharp and is securedly fixed on the recording material, and that those advantages are maintained for long period. Additionally, the thermal efficiency in the image fixing operation is high so that the temperature required for the image fixing can be decreased (by 20 degrees, for example), with the result of less consumption of the electric power. Therefore, the image fixing operation can be performed at a high speed even in the apparatus having an image fixing device supplied with less amount of electric power.

According to the method of the manufacturing described above, the elastic member according to the present invention has a quite smooth surface, whereby the necessity of abrasion is decreased.

Further examples of the present invention, i.e. the second and third examples will be described. In these examples, the resin layer consists of a plurality of layers 13 and 23, and the elastic layer side and the surface side thereof are different.

The second example will be described first, which is aimed at providing an ordinary elastic rotatable member with anti-electrification effect, in addition to the surface releasability and the durability thereof. The elastic rotatable member in this example comprises a resin layer produced by heating and sintering a resin material on the elastic layer at the temperature not lower than the sintering temperature thereof, wherein the resin layer is produced by applying and sintering the resin two or more times, thus providing two or more resin layers. The surface (outermost) layer is produced with pure resin without filling material, and the inside layer or layers consist of the resin and a filling material.

The elastic rotatable member can be used as an image fixing apparatus.

This example provides particular advantages when the elastic layer is of rubber material, particularly a silicone rubber layer, and the resin layer is of tetrafluoroethylene resin sintered at a temperature not less than 327 degrees (centigrade).

The elastic rotatable member of this example used for ordinary sheet or other article conveyance, is not easily contaminated, and can convey stably 500,000–1,000,000 or more materials. When used with an ordinary image fixing operation, 100,000 or more sheets can be processed (conventionally, several tens thousands). If the thickness of the resin layer is 5–35 microns, 200,000 or more sheets; and if it is 15–20 microns, 500,000 or more sheets, can be processed with satisfactory durability and image fixing effects.

The elastic rotatable member and the image fixing apparatus of the second embodiment is produced in the manner which has been described with FIGS. 1 and 2 with the exception of the step or steps for the resin layer having a mixed filling material.

As described, a silicone rubber roller having a core metal and a silicone rubber layer vulcanized and molded. The silicone rubber layer is reversely crowned. The surface of the rubber roller is coated with a dispersion including a fluorine resin such as PTFE and a filling material mixed therewith, and it is sintered. As for the usable filling material, there are glass, carbon black and metal oxide such as titanium dioxide, zinc oxide, tin oxide. One or plural of those materials may be mixed with the resin. Then, a second and the subsequent, as the case may be, coating and sintering are carried out. As for the outermost or the surface resin layer, no filling material is contained, and therefore, pure fluorine resin is used. It is preferable that the first fluorine resin layer with the filling material is sintered enough to prevent the inorganic semiconductor material (the filling material) from mixing into the surface layer of pure resin. The surface resin layer is only required to be substantially pure. In the elastic layer having the silicone rubber roller and the fluorine resin layer thereon, the resin property such as high strength can be provided when the fluorine resin is sufficiently sintered. Therefore, it is heated up to the crytalline melting point (327° C. or higher in PTFE, and 306° C. or higher in the PFA).

The elastic rotatable member produced in this manner has the following advantages.

(1) The fluorine resin layer which is not the surface layer contains the filling material mentioned above, whereby the electric resistance can be decreased, and simultaneously, the strength of the fluorine resin layer can be increased.

(2) The surface resin layer (fluorine resin layer) does not contain the filling material, whereby the good releasability of the (fluorine) resin layer can be maintained.

The electric resistance in the flourine resin layer of the present embodiment can be reduced in the order of $10^7$–$10^8$ as compared with the case of pure fluorine resin layer only, without damaging the surface releasability property.

Further, the fluorine resin layer contacted to the elastic layer is increased in the coating strength due to the filling material, so that it can be sufficiently durable to the sudden deformation thereof by the edges of the sheet at the nip.

The mixing of the filling material is effective to increase the thermal conductivity to improve the heat transmission to the sheet, thus increasing the fixativeness. The thermal conductivity of the pure fluorine resin is $6.0\times10^{-4}$ cal/cm.sec.°C., while that of the mixed layer is $8.0\times10^{-4}$ cal/cm.sec.°C.

More particularly, with the above-described example, the apparatus has been durable to 350,000 or more sheets, and the rate of off-set occurrence has been reduced to not more than one half of the conventional cases, without damaging the fixed image.

It is considered that those effects are provided because the resin layer itself is sufficiently sintered so that the crystallinity is low, and because the rubber layer has sufficient rubber elastic properties, and because the bonding between the rubber layer and the filling material containing resin layer, and that between the filling material containing resin layer and the pure resin layer, are firm enough due to the sintering of the resin and due to the bonding property of the filling material. Particularly, the good fixativeness is provided by the elastic layer which is effective to provide the resin layer surface with sufficient elasticity to provide good fixativeness.

The resin layer consists of three or more layers, but it is preferable that the thickness of the entire resin layer is limited from the standpoint of maintaining the substantial elasticity.

The data of actually embodied structures will be described. As for the fixing roller 1, a roller of 0.5 mm thickness silicone rubber coated with 25 microns PTFE resin layer was used which had the outside diameter in the central portion thereof of 39.8 mm and at the end portions, 39.8 mm + 100 microns (the roller is reversely crowned by 100 microns).

The core metal was in the form of a reversely crowned (100 microns) and had the central diameter of 38.75 mm. The material of the core was aluminum. The surface thereof was treated by sand blasting, and then degreased and dried. A silicone rubber sheet was wrapped therearound through a primer. Then, it was press-vulcanized at the temperature of 150° C. for 40 min., and subsequently, it is subjected to a secondary vulcanization at the temperature of 200° C. Consequently, the rubber layer was machined in the thickness of 0.5 mm.

The rubber layer was coated with a fluorine resin dispersion (including filling material, such as glass) of 15 microns thickness by spray. After it is dried, the rubber is heated at the temperature of 260°–280° C., while the fluorine resin was heated at the temperature of 350° C. for 10 minutes by the dielectric heating with the aid of the external infrared lamp heating to sinter it. Then, a pure fluorine resin dispersion (not including filling material) having 10 microns thickness, is applied and sintered as described in the foregoing.

As for the pressing roller 2, a roller was use which had a silicone rubber layer of 6 mm thickness and PFA resin layer of 20 microns thickness covering the rubber layer and which had the outside diameter of 39.9 mm.

The roller was manufactured in the following manner. The core metal was an iron tube having the outside diameter of 27.86 mm. The surface thereof was sandblasted, degreased and dried. A silicone rubber sheet is wrapped therearound through a primer. It was press-vulcanized at the temperature of 170° C. for 30 minutes, and it was subjected to a secondary vulcanization at the temperature of 200° C. for one hour. Subsequently, the rubber was machined into the thickness of 6 mm. The rubber roller was coated with PFA resin powder of the thickness of 20 microns (in the form of liquid and was dried in the similar manner as in the fixing roller). It was sintered for 10 minutes into a pressing roller having the outside diameter of 39.9 mm.

When the fixing device using those rollers maintained at the surface temperature of 170° C., a remarkable fixativeness and the fixing properties were confirmed. The amount of the off-set toner was one fifth of that provided by the best model of the conventional device. This make it possible to prolong the intervals of the replacements of the cleaning member up to 5 times. The quality of the image was good without collapse of the image. The rollers were durable to over 200,000 sheets, and even when 300,000 sheets are fixed, the fixing properties were still good and stabled.

In this example, the pressing roller has a single fluorine resin layer, but it is preferable that, similarly to the fixing roller, it is of multi-layer structure, including the fluorine resin layer with the filling material mixed therein and the pure fluorine resin layer without the filling material.

According to the second example of the elastic rotatable member (including belt and roller) is provided with anti-electrification effect, the high durability to wear and high surface releasability. Further, the material or article can be conveyed with certainty because of the surface properties of the resin layer and the elasticity of the elastic layer. Additionally, the surface fluorine resin layer is backed up by the fluorine resin layer with the mixture, whereby the service life thereof is very long. Furthermore, the electric resistance of the fixing roller can be decreased without additives to the surface resin layer, and therefore, the offset is effectively prevented. Thus, the image fixing apparatus of the second example is also durable with satisfactory fixing effects, so that a good quality of the fixed image can be provided for a long period.

The third example is directed to an elastic rotatable member comprising an elastic layer, and a resin layer on the elastic layer, formed by applying a resin material and heat-sintering it at a temperature not lower than a sintering temperature, wherein the resin layer includes at least two layers formed by repeating the application and heat-sintering of the resin material on the elastic layer, wherein an outermost layer is of a substantially uniform and smooth layer; and the innermost resin layer, which is closest to the elastic layer, has a non-continuous portion having cracks.

This example is effective particularly when the elastic layer is of rubber, particularly, silicone rubber, and the resin layer is produced by sintering tetrafluoroethylene resin at not less than 327° C.

According to this embodiment, 500,000–1,000,000 or more sheets can be conveyed without significant contamination in ordinary sheet or article conveyance. When used with an image fixing apparatus, 100,000 or more sheets can be processed in usual image fixing operation. When the thickness of the resin layer is 5–35 microns, 200,000 sheets can be produced; and further when the thickness thereof is 15–20 microns, 500,000 sheets can be processed (heat-fixing operation), with sufficient durability and image fixing effects.

In the third example, in place of the resin layer containing the filling material and formed on the elastic layer, the resin layer having cracks is formed (on the resin layer closest to the elastic, layer), while the surface resin layer has a smooth surface. The cracks has non-continuous portions in the form of a septarium as shown in FIG. 5.

Figure 4:
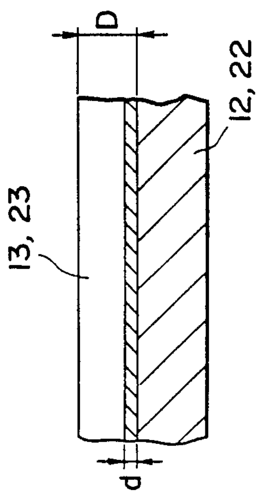
FIG. 4 is an enlarged sectional view of a surface resin layer of an elastic rotatable member according to the present invention.
Figure 5:
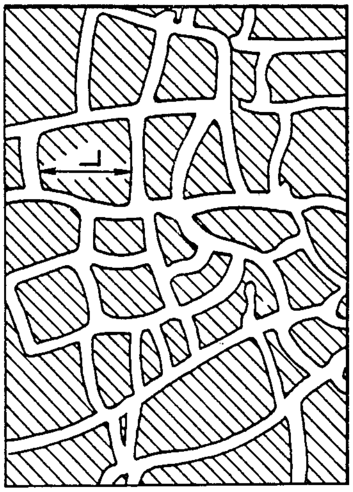
FIG. 5 is an enlarged view of a part of the resin layer.

FIG. 5 shows an enlarged view of the cracked part of this resin layer removed from the roller. The hatched portions are resin parts separated by the cracks. In this embodiment, the thickness D of the resin layer (total of the first and second) is 25 microns, and the thickness d of the cracking part of the first layer is 9–14 microns (see FIG. 4).

The rollers 1 and 2 in this embodiment are manufactured by the method described with FIG. 2 in the manners which meet the respective purposes. It is possible to form the cracks in the following manner.

As described, the unsintered fluorine resin applied on the rubber roller is completely sintered in the manner which will be described hereinafter, whereby a first fluorine resin layer with cracks is formed.

Subsequently, the second fluorine resin layer is applied on the first fluorine resin layer and is sintered, whereby a uniform and smooth second fluorine resin layer is formed.

The formation of the cracks is dependent upon the state and speed of drying and the surface conditions of the backing layer, that is, the rubber layer. In this embodiment, the drying operation was performed under the conditions of 50°–100° C. and 30–60% humidity, and the above described cracks were provided. The period of this heating may be 30 seconds – 5 minutes. It should be noted that the amount of cracks increases with decreasing the heating period.

On the other hand, the second layer was heated and dried under the conditions of the temperature 30°–60° C. and the relative humidity 50–70%. The period of the heating was 3–20 minutes. In this manner, the second layer was without cracks, so that a uniform and smooth fluorine resin layer can be obtained.

For the reasons described hereinbefore, the sintering method is such that the silicone rubber roller is maintained at such a temperature that the silicone rubber roller is not smoked or depolymerized (300° C. at maximum), while the applied fluorine resin is heated up to a temperature higher than the crystalline melting point of the resin.

Similarly to the above described embodiment, after sintering and quickly cooling, a sufficiently thick sintered fluorine resin layer is formed, bonding strongly to the rubber layer, wherein the resin layer has the degree of crystallinity of not more than 95%; the tensile strength of not less than 50 kg/cm$^2$; and the contact angle (water) of not less than 100 degrees. The rubber properties of the backing layer of silicone rubber of the fixing roller 1 or the heating roller 2 are substantially the same as before the sintering although the surface resin layer is completely sintered.

The advantages provided by the formation of the cracks will be described.

Without the cracks, the resin has a high volume resistivity, which may sometimes be so high that the contamination of the roller surface is increased by the triboelectric charge produced during conveyance. When the cracks are formed, the resin layer has a lower volume resistivity, namely, in the order of $10^7$–$10^8$. Owing to the low resistivity, it may be unnecessary to add particular materials to the resin layer in order to decrease the resistivity as therefore to prevent the electrification (triboelectric charge) and the contamination of the surface layer.

It is important to note that the cracks are formed not adjacent the surface of the resin layer but in the inside part thereof, whereby the smoothness of the resin layer surface is not damaged, thus maintaining the sufficient releasability of the surface. Further, because of the existence of the cracks, the bonding to the backing rubber layer is made stronger.

The fixing device having the rollers produced in this manner has showed the durability to image fixing operations of 300,000 sheets, with one half of the off-set occurrences as compared with the conventional device, and further the fixed image has a good image quality.

It is preferable that the thickness D of the non-crack layer and the thickness d of the crack layer satisfy:

$$D-d \geqq 5 \text{ (micron)}.$$

The dimension of the land L as indicated in FIG. 5 is preferably not less than 0.05 microns but not more than 5 mm.

The cracks can be observed after the roller is manufactured. However, as in the case of heat fixing where the elastic layer is heated, the cracks are not observed by naked eyes because the light scattering decreases due to the thermal expansion or thermal hysteresis of the elastic layer heated during or after use. In such a case, they can be observed by a microscope of 10–100 magnification, so that the existence and effects thereof can be confirmed.

Next, the method of producing the cracks will be described. The formation of the cracks is different depending on the thickness of the resin layer. For example, when the first resin layer having a thickness not less than 8–12 microns is to be produced, the drying operation is effected under the conditions of 60°–100° C., 30–50% humidity for 30 seconds - 5 minutes. Depending on the degree of drying after the dispersion is applied, the crack can extend up to the surface, which is not desirable. If this occurs, therefore, the surface layer is repaired by heating and pressing the surface thereof. The conditions are more or less different depending on the thickness of the resin layer, which however can be determined suitably by one skilled in the art in consideration of the description of this specification.

The cracks may be produced by changing the surface conditions of the backing elastic layer. For example, the cracks can be provided if the surface of the elastic layer before the resin is applied is cleaned by so-called neutral soap and abrading it two or three times with alumina abrasive powder. If it is abraded 5 times or more, the surface of the elastic layer is cleaned too much to form the cracks. If the normal surface abrasion is performed relatively roughly without using the abrasive material, the particles resulting from the abrasion deposited on the surface are effective to produce the cracks. Those methods are suitable when the thickness of the resin film is not more than 15 microns.

The rollers produced in this manner, when used for the image fixing, are less chargeable due to the existence of the cracks, and the bonding strength between the rubber layer and the fluorine resin layer is high, so that the surface layer is not so rapidly peeled as in the conventional device. Further, the durability is remarkably increased. Additionally, the silicone rubber characteristics are not deteriorated by heat, while the fluorine resin layer is completely sintered, and therefore, it has a sufficient impact resilience with less permanent compression stress. The surface releasability and the durability to wear is increased without damaging the elasticity. Because of the cracks, the roller has a very long service life, and the off-set preventing effects can be enjoyed without adding any additives to the resin layer, since the cracks decrease the resistivity.

More particularly, it is formed in the manner described with the second example. The first resin layer is preferably formed in the following manner, so as to obtain the advantages of the second example. Namely, the rubber layer was coated with a fluorine resin dispersion (including filling material, such as glass) of 15 microns thickness by spray. After it is dried, the rubber is heated at the temperature of 260°–280° C., while the fluorine resin was heated at the temperature of 350° C. for 10 minutes by the dielectric heating with the aid of the external infrared lamp heating to sinter it. Then, a pure fluorine resin dispersion (not including filling material) having 10 microns thickness, is applied and sintered as described in the foregoing.

In this example, it is preferable that, similarly to the fixing roller, the pressing roller has an underlying fluorine resin layer with cracks and a surface fluorine resin layer having uniform and smooth surface, although the above-described example is not so treated.

The elastic rotatable member (including belt and roller) according to the third example of the present invention is provided with anti-electrification effects, the durability to wear, the surface releasability, the good surface property of the resin layer and the good elastic property of the elastic layer. Therefore, the materials can be conveyed with certainty. Furthermore, there is provided an underlying fluorine resin layer with cracks, whereby the service life thereof is very long. And, the electric resistance of the fixing rotatable member can be reduced without additives mixed into the surface layer resin, so that the off-set prevention effect is increased.

The parameters relating to the structures of the elastic rotatable member are described with the conditions preferable to the present invention.

Silicone rubber (12 and 22) has:

Rubber hardness (JISA): not less than 30 degrees and not more than 80 degrees
Impact resilience: 65–85%
100% tensile stress: not less than 10 kg/cm$^2$
Elongation: not less than 150%
Coefficient of oxidative deterioration: not more than 2.

Fluorine resin layer (13 and 23) has:

Thickness of the resin film: not less than 5 microns and not more than 30 microns
Contact angle: not less than 100 degrees
Elongation: not less than 50%
Tensile strength: not less than 50 kg/cm$^2$
Degree of crystallinity: not more than 95%.

The bonding strength between the silicone rubber and the fluorine resin is 20–120 g/10 mm (width) without primer.

Of these parameters, the method of determining the impact resilience, the contact angle, the elongation of the fluorine resin layer, the tensile strength, the degree of crystallinity and the bonding strength will be described. The impact resilience, the tensile stress and the elongation of the rubber are determined on the basis of the method defined in JIS (Japanese Industrial Standard) K6301.

More particularly, the test piece is in a form dumbbell having the size of 5 mm (width) × 20 mm length) × 3 mm (thickness). The silicone rubber only is taken out of the roller member comprising the silicone rubber layer and the fluorine resin surface layer. Namely, a roller is produced by forming a fluorine resin layer sintered on a silicone rubber layer by heating the fluorine resin layer up to a temperature of 327° C. or higher, while maintaining the silicone rubber at a temperature below 300° C., so as to provide the resin coating having the properties of a contact angle not less than 100 degrees, the elongation of not less than 50% and the tensile strength of not less than 50 kg/cm$^2$. Then, the surface fluorine resin layer is taken out, and subsequently the tensile stress and the elongation are measured in accordance with JIS K6301.

As regards the impact resilience, a silicone rubber test piece having the dimension of 12.7±0.13 mm (thickness) × 29.0 mm (diameter) is produced, which is then heated in the manner described above. After that, the silicone rubber only is taken out, and then the measurement is carried out on the basis of JIS K6301.

As for the silicone rubber of the fixing roller according to this embodiment of the present invention, a piece of silicone rubber with the sintered coating of fluorine resin having the dimensions of 5 mm (width) × 20 mm (length) × 0.3–0.5 mm(thickness) is removed from the core metal thereof, and then the fluorine resin layer is peeled off the silicone rubber. Then, the tensile strength and the elongation are measured in accordance with JIS K6301.

It is desirable that the thickness of the silicone rubber layer is uniform. However, it is difficult to produce such a sample, and therefore, actually it is difficult to make it uniform. The measurements are adopted as approximately 70–80% of the measured values of the test piece described above.

The impact resilience (65–85%) is representative of power of following, with resilience, the minute surface roughness of the paper and the projection created by the existence of the toner during the short period of image fixing operation. When the fixing roller surface follows them sufficiently, it is possible to apply the heat and pressure to the toner effectively. According to the inventors' experiments, when a surface fluorine resin layer of 5–30 microns thickness was used, the satisfactory image fixing could be performed if the impact resilience of the backing silicone rubber layer is 65–85%. The tensile stress and the elongation of the rubber represent the fundamental property of the rubber concerned with the durability and the fixing property of the fixing roller. The fixing roller using the silicone rubber having 100% tensile stress of 10 kg/cm$^2$ and the elongation of 150% provided the durability of approx. 200,000 sheets with the satisfactory fixing properties due to the sufficient impact resilience. With the 100% tensile stress of 20 kg/cm$^2$ and the elongation of 300% of the silicone rubber, the durability was not less than 300,000 sheets with good fixing property.

On the other hand, with the 100% tensile stress 7 kg/cm$^2$ and the elongation of 200%, the roller was durable to 150,000 sheets without jam, but by 10 jammings thereafter, the rubber was broken by the pawl. With the 100% tensile stress of 15 kg/cm$^2$ and the elongation of 80%, the roller was durable to 100,000 sheets, but by 5 jammings thereafter, the rubber was broken. Those rubbers are not covered by the present invention. The impact resilience thereof was 40–60%, and the fixing properties were rather poor.

Next, the description will be made as to the surface resin layer after the production of the roller.

The degree of crystallinity of the resin was measured by infrared absorption spectrum, but this might be measured by X rays or gravity. The contact angle was measured by a droplet shape method (the Japanese Journal "Metal Surface Technique" 17, No. 7, 1966). In the actual measurement of the contact angle with respect to water, the front side contact angle and the rear side contact angle may be different from each other (for example, 118 degrees and 91 degrees). The satisfactory results could be obtained if one of them or the average was not less than 100 degrees.

For the purpose of determining the elongation and the tensile strength of the resin layer, the resin film is peeled off the roller after being manufactured. The dimension is 15 mm (width) × 100 mm (length) as a test piece. The test piece is pulled between the chucks spaced apart by 20 mm at the pulling rate of 250 mm/min. The averages are taken as data. For example, the test piece having the tensile strength of 95 kg/cm$^2$ and the elongation of 80% may mean that the minimums are 72 kg/cm$^2$ and 60%, and the maximums are 180 kg/cm$^2$ and 120%.

As for the peel strength of the resin, the roll surface is cut circumferentially in two lines spaced apart by 10 mm by a knife, and a partly peeled part of the fluorine resin layer is pulled by a tension meter, and the maximum measurement is taken as the peel strength.

The present invention is applicable not only to the roller used for fixing an image but also to a belt (rotatable member), such as an intermediate belt usable for transferring and fixing an image simultaneously, a cleaning roller, a parting agent applying roller and others. In those applications, the rotatable member of the present invention has the proper releasability and elasticity so that the image transfer action and the cleaning action are improved (when it is used as a cleaning roller, the cleaning is effected on the basis of the order of surface energy). Further, due to the sufficient elasticity, the parting agent can be applied uniformly, and the image transfer is also uniform. Additionally, the durability to wear is improved in each of the applications.

FIG. 1 has showed a heating type image fixing device to which the present invention is conveniently applicable. However, the present invention is applicable to a pressure fixing type in which the toner image is fixed by a relatively low pressure, or to a pressure fixing device or a heat fixing device wherein the image is fixed simultaneously with the image transfer.

In the foregoing embodiments, the devices have been shown as being constituted by two rollers, but the present invention is applicable to each or a part of the rollers of the device including three or more rollers. The present invention is applicable to a parting agent supplying roller, cleaning roller or belts of such a structure.

The present invention covers the above described embodiments wherein the thickness of the rubber layer is 0.1–1.0 mm, and the thickness of the resin layer is 1–50 microns. Each of the thickness values is an average, or more preferably, the minimum.

In the embodiments described above, no bonding layer is used between the fluorine resin layer and the silicone rubber layer. However, the present invention covers the case where the bonding layer is used.

As described in the foregoing, according to the present invention, the resin layer has the adhering or bonding portion, and therefore, the resin layer fused and sintered substantially on the elastic layer is effective to increase the close-contact with respect to the backing elastic layer. Therefore, the properties of the elastic rotatable member or the image fixing device after the manufacturing can be made uniform.

The present invention covers any combination of the first, the second and the third examples with the respective advantages.

While the invention has been described with reference to the structures disclosed herein, it is not confined to the details set forth and this application is intended to cover such modifications or changes as may come within the purposes of the improvements or the scope of the following claims.

What is claimed is:

1. A roller for fixing an image, comprising:

a core member;

an elastic rubber layer on said core member;

at least two fluorine resin layers on said elastic layer, said resin layers being provided by sintering unsintered fluorine resin, the outside one of said resin layers being free of filler material.

2. A roller according to claim 5, wherein said fluorine resin layers are provided by heat-sintering flourine resin at a temperature above its crystalline melting point.

3. A roller according to claim 2, wherein said resin layer is of a tetrafluoroethylene resin or perfluoroalkoxyethylene resin, and wherein said elastic layer is of a silicone rubber, the silicone rubber layer is maintained lower than 300° C. upon sintering of the resin layers.

4. A roller according to claim 1, wherein the inside one of said resin layers contains a small amount of filler which includes at least one material of the group consisting of glass, carbon black and metal oxide.

5. An image fixing apparatus, comprising:

a first rotatable member containing therein a heat source and adapted to contact an unfixed image to be fixed;

a second rotatable member associated with said first rotatable member to fix the unfixed image;

said first rotatable member, comprising:

a core member;

an elastic rubber layer on said core member;

at least two fluorine resin layers provided on said elastic layer by sintering unsintered fluorine resin, an outside one of said resin layers being free of filler material.

6. An apparatus according to claim 5, wherein said fluorine resin layers are provided by heat-sintering fluorine resin at a temperature above its crystalline melting point.

7. An apparatus according to claim 6, wherein said resin layer is of a tetrafluoroethylene resin or perfluoroalkoxyethylene resin, and wherein said elastic layer is of a silicone rubber, the silicone rubber layer is maintained lower than 300° C. upon sintering of the resin layers.

8. An apparatus according to claim 5, wherein the inside one of said resin layers contains a small amount of filler which includes at least one material of the group consisting of glass, carbon black and metal oxide.

9. An apparatus according to claim 5, further comprising cleaning means, contacted to a surface of the outermost resin layer for cleaning the surface.

10. An apparatus according to claim 5, further comprising detecting means for detecting a temperature of said first rotatable member and control means for controlling the heat source in accordance with the detection by said detecting means, and wherein said detecting means detects a temperature of said resin layers.

11. An apparatus according to claim 5, wherein the surface of said second rotatable member is of resin.

12. An apparatus according to claim 11, wherein the surface of said first and second rotatable member are of fluorine resin.

13. An apparatus according to claim 12, wherein the surface of said first rotatable member is of tetrafluoroethylene resin and the surface of said second rotatable member is of perfluoroalkoxyethylene resin.

14. An apparatus according to claim 11, wherein a resin layer thickness of said first rotatable member is larger than said second rotatable member.

15. An apparatus according to claim 11, wherein said second rotatable member includes an elastic layer under said resin layers, the elastic layer having a thickness larger than that of said elastic layer of said first rotatable member.

* * * * *

UNITED STATES PATENT AND TRADEMARK OFFICE
CERTIFICATE OF CORRECTION

PATENT NO. : 4,883,715 Sheet 1 of 5

DATED : November 28, 1989

INVENTOR(S) : TSUKASA KUGE, ET AL.

It is certified that error appears in the above-identified patent and that said Letters Patent is hereby corrected as shown below:

COVER PAGE,

Item [56], "Sekurai" should read --Sakurai--; "0069542 3/1968 German Democratic Rep." should read --0069542 10/1969 German Democratic Rep.--;

Item [57], last line, "is" should read --are--.

COLUMN 1, line 32, "long time" should read --long-time--;

line 37, "long time" should read --long-time--; same line, "results" should read --result--.

COLUMN 3, line 51, "embodiments" should read --embodiment--;

line 52, "an" should read --and--.

COLUMN 4, line 27, "an" should read --a--;

line 51, "$1.4 \times 10^{-3}$" should read --$1.4 \times 10^{-4} - 1.5 \times 10^{-3}$--;

line 54, "reversely crowned" should read --reverse crown--;

line 66, "(of PFA)" should read --of PFA)--.

COLUMN 5, line 64, "layer. Therefore," should read --layer,--.

UNITED STATES PATENT AND TRADEMARK OFFICE
CERTIFICATE OF CORRECTION

PATENT NO. : 4,883,715

DATED : November 28, 1989

INVENTOR(S) : TSUKASA KUGE, ET AL.

It is certified that error appears in the above-identified patent and that said Letters Patent is hereby corrected as shown below:

COLUMN 6, line 3, "such" should read --as--;

line 15, "above. However," should read --above, however,--;

line 18, "contains which" should be deleted;

line 39, "includes" should read --include--.

COLUMN 7, line 1, "those layer" should read --those layers--;

line 54, "are" should read --and--;

line 63, "was" should read --were--;

line 65, "dialgage" should read --dial guage--.

COLUMN 8, line 29, "has" should read --have--.

COLUMN 9, line 21, "contracts" should read --contacts--;

line 46, "30,000" should read --300,000--;

line 50, "lease" should read --least--.

COLUMN 10, line 4, "affect" should read --effect--;

line 33, "belt" should read --belt)--.

UNITED STATES PATENT AND TRADEMARK OFFICE
CERTIFICATE OF CORRECTION

PATENT NO. : 4,883,715 Sheet 3 of 5

DATED : November 28, 1989

INVENTOR(S) : TSUKASA KUGE, ET AL.

It is certified that error appears in the above-identified patent and that said Letters Patent is hereby corrected as shown below:

COLUMN 11, line 23, "having" should read --has--;

line 38, "inorganic semiconductor" should read --inorganic or the semiconductor--;

line 45, "crytalline" should read --crystalline--.

COLUMN 12, line 36, "reversely" should read --reverse--;

line 37, "crowned" should read --crown--;

line 57, "use" should read --used--.

COLUMN 13, line 3, "liquid" should read --liquid)--;

line 4, "roller)." should read --roller.--;

line 7, "using" should read --used--;

line 12, "make" should read --made--;

line 17, "stabled." should read --stable.--;

line 24, "According to" should read --Accordingly,--.

COLUMN 14, line 1, "has" should read --have--;

line 28, "above described" should read --above-described--;

line 45, "above described" should read --above-described--.

UNITED STATES PATENT AND TRADEMARK OFFICE

CERTIFICATE OF CORRECTION

PATENT NO. : 4,883,715 Sheet 4 of 5

DATED : November 28, 1989

INVENTOR(S) : TSUKASA KUGE, ET AL.

It is certified that error appears in the above-identified patent and that said Letters Patent is hereby corrected as shown below:

COLUMN 16, line 66, "form dumbbell" should read --dumbbell form--;

line 67, "--20mm length)" should read --20mm (length)--.

COLUMN 17, line 57, "stress 7" should read --stress of 7--.

COLUMN 18, line 55, "above described" should read --above-described--.

COLUMN 19, line 21, "claim 5," should read --claim 1,--;

line 39, "member," should read --member--.

UNITED STATES PATENT AND TRADEMARK OFFICE

CERTIFICATE OF CORRECTION

PATENT NO. : 4,883,715 Sheet 5 of 5

DATED : November 28, 1989

INVENTOR(S) : TSUKASA KUGE, ET AL.

It is certified that error appears in the above-identified patent and that said Letters Patent is hereby corrected as shown below:

COLUMN 20, line 19, "layer" should read --layer,--;

line 29, "member" should read --members--;

line 37, "than said" should read --than that of said--.

Signed and Sealed this

Fifteenth Day of January, 1991

*Attest:*

HARRY F. MANBECK, JR.

*Attesting Officer* *Commissioner of Patents and Trademarks*